United States Patent [19]

Tapis

[11] 4,132,701
[45] Jan. 2, 1979

[54] METHOD OF MANUFACTURING A RESIN CONCRETE

[76] Inventor: Claude Tapis, Villa Rosiris, 34000 Montpellier, France

[21] Appl. No.: 805,542

[22] Filed: Jun. 10, 1977

[51] Int. Cl.² .......................... C08K 3/22; C08K 9/02
[52] U.S. Cl. ..................................... 260/42; 260/2.3; 260/42.43; 260/42.44; 260/42.45; 260/42.46; 260/42.49; 260/998.19
[58] Field of Search ............. 260/42.45, 42.44, 998.19, 260/42.43, 42.46, 42.49, 42

[56] References Cited

U.S. PATENT DOCUMENTS 3,070,557  12/1962  Gessler et al. ................. 260/998.19

OTHER PUBLICATIONS

Renfrew et al., Polythene, Iliffe & Sons' Ltd., London, 1957, p. 425.

*Primary Examiner*—James H. Derrington
*Attorney, Agent, or Firm*—William Anthony Drucker

[57] ABSTRACT

A method of manufacturing a resin concrete, where the concrete is composed of inert fillers and of thermoplastic resin. This method is characterized by the fact that the resin is used as a bonding agent and that an oxidizing additive is added to the thermoplastic resin to ensure the bonding of the resin to the fillers.

3 Claims, No Drawings

METHOD OF MANUFACTURING A RESIN CONCRETE

The present invention relates to a method of manufacturing a resin concrete, where the concrete is composed of inert fillers and thermoplastic resin.

Resin concretes have been known for a number of years. These concretes generally use thermosetting resins that make the product very expensive due to the high price of such resins.

Concretes using thermoplastic resins are also made but the very high percentage of resin used, about 15 to 25% by weight of the filler, renders their utilization difficult and their cost very high.

Finally, certain mixtures with cement have been put forward. These, in general, are cement-glues.

The invention's purpose is to remedy the disadvantages quoted above, due to the known oxidation effects, even of a superficial nature, on polyolefines that are oxidizable polymers or polymers sensitive to atmospheric oxidation. This oxidation gives better adherence and is a property of which use is made for the better catching of printing inks. However, special treatments are necessary to obtain such oxidation that may consist of the use of an oxidising flame or of a sulphochemical mixture of chloride or even electron bombardment. All these require special apparatus, thus of an expensive nature, to achieve superficial oxidation.

The process, according to the invention, is characterized in that the resin is used as the bonding agent and in that an oxidising agent is added to the thermoplastic resin to ensure the bonding of the resin to the fillers.

The contribution of the additive, even in small quantities, mixed with the thermoplastic resin will modify, by the oxidation process, the molecular chains that are normally apolar and disinclined to bind in any way into chain groups that have a polarity that encourages materials' absorptivity and that thus permits the filler with which it is mixed to be bound, right through its volume.

This modification obtained by means of oxidation and without special apparatus or preliminary treatment, permits good quality, high strength concretes to be obtained that were not attainable up to the present time.

EXAMPLE

Test pieces made of 0/10 limestone Filler weight: 95%; thermoplastic resin plus additive: 5%.

| DURIEZ test. | |
| --- | --- |
| Compression | 260 Bars |
| Tensile (Brasilian) | 60 Bars |
| Punching | 1,000 Bars |

The preparation of such a concrete is easy, due to the fact that machines presently available in the trade for asphalt and bituminous coating preparation may be used.

EXAMPLE OF A MANUFACTURING PROCESS 1,000 kg of gravel of some given size, for example, 0.8 limestone, is put into a heating mixer having temperature regulation and air circulation and its temperature taken up to 180° C. When the gravel has been thoroughly heated 49.500 kg of resin is added (preferably polyethylene) together with 0.500 kg of additive, such as micronized alumina for example, and the whole maintained at the temperature mentioned above. The mixer will be turned for some moments and, when homogeneity is achieved, the mixture is spread and rolled in a similar way to a bituminous coating.

By virtue of its properties, the concrete may be used for countless applications such as surface coatings of all kinds, thoroughfares, roads, motorways, airstrips, parking lots, service stations, industrial floorings, pavements, perforated motorway edges, harbour-works, retaining tanks (dams), railway sleepers, pipes, tiling, paving stones, sports tracks, tennis courts, etc..

In the building trade, due to its thermal, phonic and watertight characteristics, it may be used for partition walls, floors, ceilings, terraces, etc..

The fillers used to make the resin concrete may be of all types: gravels whether crushed or not, basalt, porphyry, pozzolana, marble chips, expanded glass balls, expanded clay, sea sand, etc., with the percentage of additive amounting to about 1 to 6% by weight of the thermoplastic resin.

The thermoplastic resins used may be polyethylene, polyvinyl chloride, polystyrene, neutral vinyl chloride in the form of industrial or recovered waste material. The percentage of thermoplastic resin will be between 2 and 12% by weight of the fillers.

I claim:

1. A process for the production of a resin-based concrete which comprises mixing
   (i) an inert filler
   (ii) a thermoplastic resin selected from the group consisting of polyethylene, polyvinylchloride and polystyrene, the thermoplastic resin being present in an amount within the range of 2–12% inclusive by weight of the inert filler
   (iii) alumina present in an amount within the range 1–6% by weight of the thermoplastic resin.

2. The process claimed in claim 1, wherein the inert filler is selected from the group consisting of
   Limestone
   Porphyry
   Pozzolana
   Marble chips
   Expanded glass balls
   Expanded clay
   Sea sand.

3. The process for the production of a structure from resin-based concrete comprising the steps of:
   (i) heating 1000 kg. of limestone gravel filler to 180° C.
   (ii) adding to the heated gravel 49.5 kg. of particulate polyethylene and 0.5 kg. of micronized alumina
   (iii) whilst maintaining the whole at 180° C., mixing the constituents until homogeneous
   (iv) spreading and rolling the mixture whilst still hot
   (v) allowing the spread and rolled mixture to set by cooling.

* * * * *